United States Patent
Stanich et al.

(10) Patent No.: US 11,783,150 B2
(45) Date of Patent: Oct. 10, 2023

(54) ARTIFACT COMPENSATION MECHANISM

(71) Applicants: Mikel Stanich, Boulder, CO (US);
Walter F. Kailey, Boulder, CO (US);
Nikita Gurudath, Boulder, CO (US);
Ziling Zhang, Boulder, CO (US);
Brandon Skogen, Boulder, CO (US)

(72) Inventors: Mikel Stanich, Boulder, CO (US);
Walter F. Kailey, Boulder, CO (US);
Nikita Gurudath, Boulder, CO (US);
Ziling Zhang, Boulder, CO (US);
Brandon Skogen, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 155 days.

(21) Appl. No.: 17/506,322

(22) Filed: Oct. 20, 2021

(65) Prior Publication Data
US 2023/0123461 A1 Apr. 20, 2023

(51) Int. Cl.
*G06K 15/00* (2006.01)
*G06K 15/02* (2006.01)
*G06K 15/10* (2006.01)

(52) U.S. Cl.
CPC ....... *G06K 15/1881* (2013.01); *G06K 15/102* (2013.01)

(58) Field of Classification Search
None
See application file for complete search history.

(56) References Cited

U.S. PATENT DOCUMENTS

| 7,585,038 | B2 | 9/2009 | Shibata et al. | |
|---|---|---|---|---|
| 8,714,692 | B1 * | 5/2014 | Metcalfe | B41J 2/2142 347/19 |
| 8,882,236 | B1 * | 11/2014 | Kroon | B41J 2/2139 347/88 |
| 9,573,382 | B1 | 2/2017 | Metcalfe | |
| 10,449,759 | B2 | 10/2019 | Trachanas et al. | |
| 10,507,647 | B1 * | 12/2019 | Tal | B41J 2/2139 |

(Continued)

FOREIGN PATENT DOCUMENTS

| CN | 107709015 | 2/2018 |
|---|---|---|
| CN | 110871626 | 3/2020 |

OTHER PUBLICATIONS

Notice of Allowance for U.S. Appl. No. 17/506,279, dated May 12, 2023, 12 pages.

(Continued)

*Primary Examiner* — Dung D Tran
(74) *Attorney, Agent, or Firm* — Jaffery Watson Mendonsa & Hamilton LLP

(57) ABSTRACT

A system is disclosed. The system includes at least one physical memory device to store compensation logic and one or more processors coupled with the at least one physical memory device to execute the compensation logic to generate first ink deposition function representing a first output ink amount versus input digital count for each of a plurality of color planes, generate second ink deposition function representing a second output ink amount versus input digital count for each of the plurality of color planes and generate transfer functions for each of the plurality of color planes based on the first ink deposition function and the second ink deposition function, wherein the transfer functions transform input digital counts.

20 Claims, 15 Drawing Sheets

(56) References Cited

U.S. PATENT DOCUMENTS

| | | | |
|---|---|---|---|
| 10,538,106 B2 | 1/2020 | Stritzel | |
| 10,696,062 B2* | 6/2020 | Hauck | B41J 2/2139 |
| 11,338,591 B1* | 5/2022 | Kailey | B41J 2/2139 |
| 2004/0046811 A1* | 3/2004 | D'Souza | B41J 2/04508 |
| | | | 347/12 |
| 2012/0050755 A1 | 3/2012 | Chandu et al. | |
| 2013/0176600 A1 | 7/2013 | Chandu et al. | |
| 2013/0278658 A1* | 10/2013 | Metcalfe | B41J 2/2139 |
| | | | 347/14 |
| 2016/0052318 A1 | 2/2016 | Humet et al. | |
| 2017/0236041 A1 | 8/2017 | Stanich et al. | |
| 2019/0070848 A1* | 3/2019 | Trachanas | B41J 2/2139 |
| 2020/0108632 A1 | 4/2020 | Billow | |
| 2020/0274991 A1 | 8/2020 | Stanich et al. | |
| 2021/0271431 A1 | 9/2021 | Stanich | |
| 2022/0284247 A1 | 9/2022 | Stanich | |
| 2022/0284250 A1 | 9/2022 | Kailey | |
| 2023/0120258 A1* | 4/2023 | Stanich | H04N 1/405 |
| | | | 347/15 |

OTHER PUBLICATIONS

Jin, Y. A., He, Y., Gao, Q., Fu, J. Z., & Fu, G. Q. (2014). Droplet deviation modeling and compensation scheme of inkjet printing. The International Journal of Advanced Manufacturing Technology, 75(9-12), 1405-1415. See highlighted sections.

Office Action for U.S. Appl. No. 17/506,279, dated Apr. 18, 2023, 10 pages.

\* cited by examiner

ARTIFACT COMPENSATION MECHANISM

FIELD OF THE INVENTION

The invention relates to the field of image reproduction, and in particular, to uniformity compensation.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a print engine that includes one or more printhead assemblies, where each assembly includes a printhead controller and a printhead (or array of printheads). Each printhead contains many nozzles (e.g., inkjet nozzles) for the ejection of ink or any colorant suitable for printing on a medium.

Prior to commencing printing operations, uniformity compensation may be performed to compensate for measured response differences for a print head nozzle which is not jetting properly. Compensation methods are based on uniformity compensation of nozzles. However, various nozzles may become defective during printer operation, which may lead to undesired changes in jetting output (e.g., ink deposition artifacts such as jet-outs or deviated jets) caused by the defective nozzles.

Current uniformity compensation relies on multiple iterations of optical measurements of nozzles to obtain adequate compensation of adjacent nozzles in order to compensate for a nozzle that is not jetting properly. Having to perform multiple iterations of compensation is an inefficient process as it takes up time and requires more printing of test patterns.

Accordingly, an improved mechanism to perform nozzle compensation for jet-outs and deviated jets is desired.

SUMMARY

In one embodiment, a system is disclosed. The system includes at least one physical memory device to store compensation logic and one or more processors coupled with the at least one physical memory device to execute the compensation logic to generate first ink deposition function representing a first output ink amount versus input digital count for each of a plurality of color planes, generate second ink deposition function representing a second output ink amount versus input digital count for each of the plurality of color planes and generate transfer functions for each of the plurality of color planes based on the first ink deposition function and the second ink deposition function, wherein the transfer functions transform input digital counts.

BRIEF DESCRIPTION OF THE DRAWINGS

A better understanding of the present invention can be obtained from the following detailed description in conjunction with the following drawings, in which.

DETAILED DESCRIPTION

An artifact compensation mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
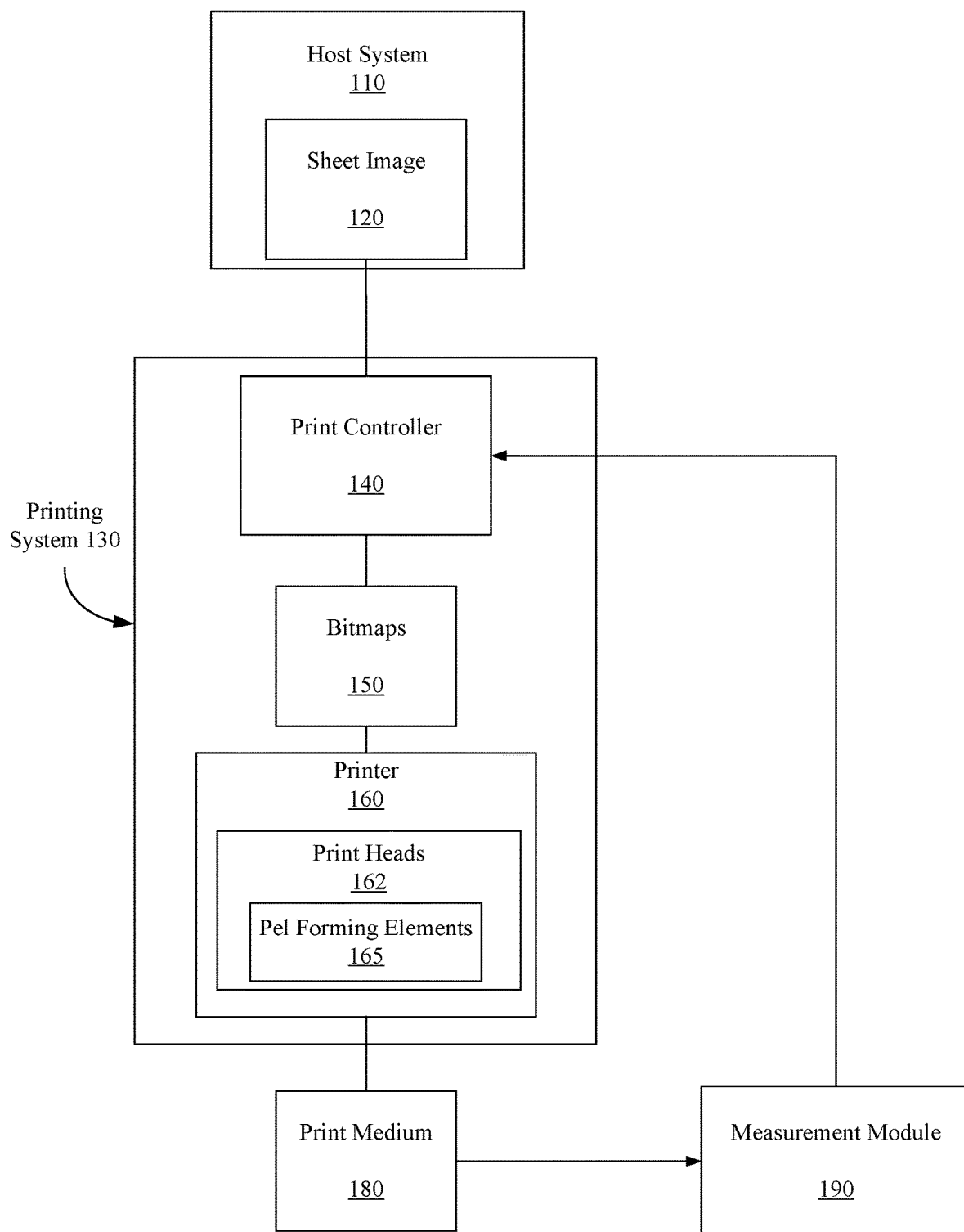
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser).

According to one embodiment, pel forming elements may be grouped onto one or more printheads. The pel forming elements 165 may be stationary (e.g., as part of a stationary printhead) or moving (e.g., as part of a printhead that moves across the print medium 180) as a matter of design choice. In a further embodiment, pel forming elements 165 may be assigned to one of one or more color planes that correspond to types of marking materials (e.g., Cyan, Magenta, Yellow, and blacK (CMYK)). These types of marking materials may be referred to as primary colors.

Printer 160 may be a multi-pass printer (e.g., dual pass, 3 pass, 4 pass, etc.) wherein multiple sets of pel forming elements 165 print the same region of the print image on the print medium 180. In such an embodiment, the set of pel forming elements 165 may be located on the same physical structure (e.g., an array of nozzles on an ink jet print head) or separate physical structures. The resulting print medium 180 may be printed in color and/or in any of a number of gray shades, including black and white (e.g., Cyan, Magenta, Yellow, and blacK, (CMYK) and secondary colors (e.g., Red, Green and Blue), obtained using a combination of two primary colors). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. Bitmap 150 may be a halftoned bitmap (e.g., a compensated halftone bit map generated from compensated halftones, or un-compensated halftone bit map generated from un-compensated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a halftone compensation system to obtain measurements of the printed medium 180. The measured results are communicated to print controller 140 to be used in a halftone compensation process. The measurement system may be a stand-alone process or be integrated into the printing system 130.

According to one embodiment, measurement module 190 may be a sensor to take optical measurements of printed images on print medium 180. Measurement module 190 may generate and transmit measurement data. Measurement data may be OD (e.g., optical density), perceptual lightness (e.g., L* in the CIELAB color space L*a*b*) and/or scanned image (e.g., RGB) data corresponding to a printed image. In one embodiment, measurement module 190 may comprise one or more sensors that individually or in total take measurements for printed markings produced for some or all pel forming elements 165. In another embodiment, measurement module 190 may be a camera system, in-line scanner, densitometer or spectrophotometer.

In a further embodiment, measurement data may include a map information to correlate portions of the measurement data (e.g., OD data) to the corresponding pel forming elements 165 that contributed to the portions of the measurement data. In another embodiment, the print instructions for a test pattern (e.g., step chart) provides the correlation of the portions of the measurement data to the corresponding pel forming elements that contributed to the portions of the measurement data.

Figure 2A:
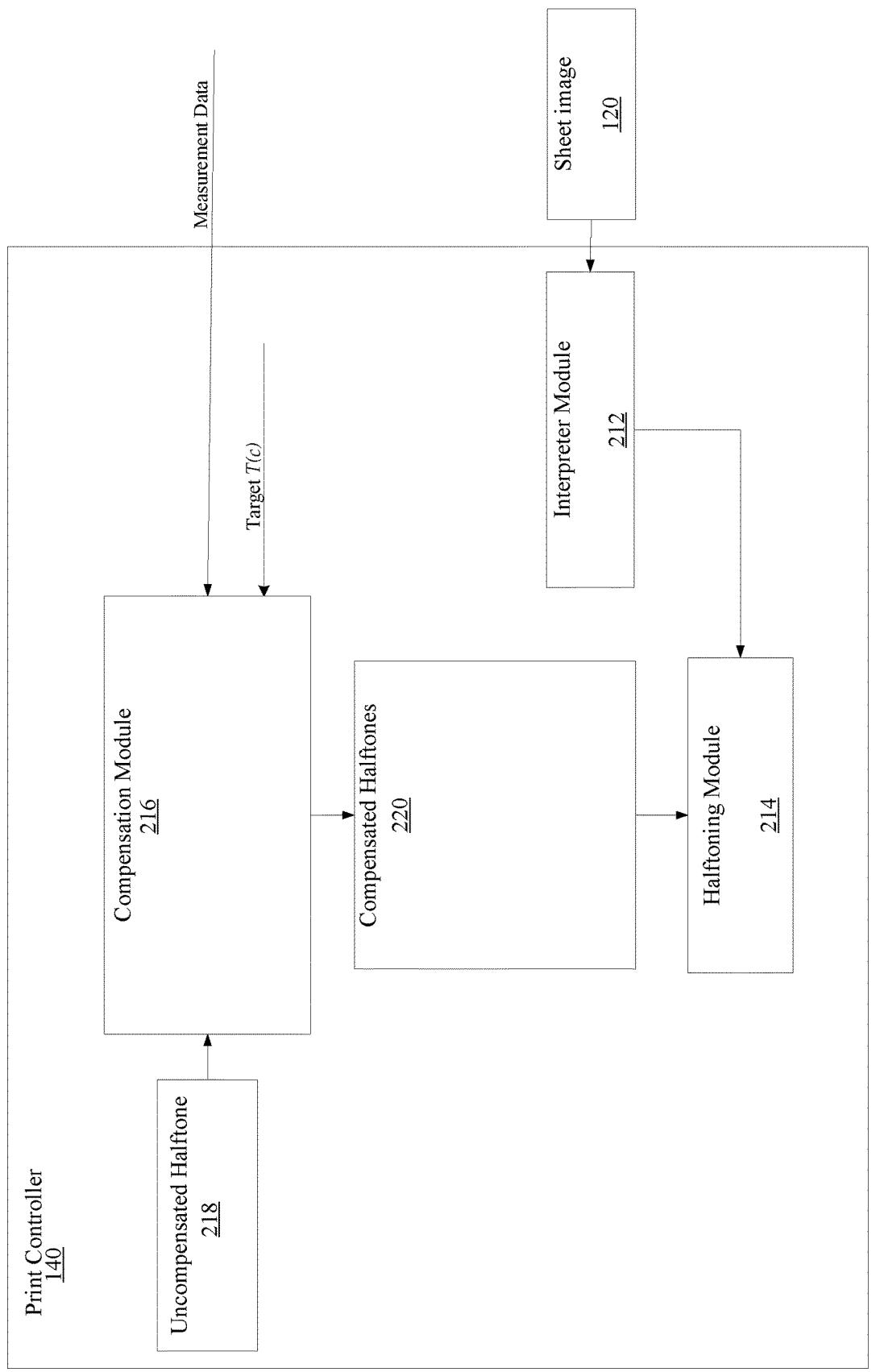
FIG. 2A is a block diagram of one embodiment of a print controller.

FIG. 2 is a block diagram illustrating one embodiment of a print controller 140. The print controller 140, in its generalized form, includes an interpreter module 212, a halftoning module 214, and a compensation module 216. These separate components may represent hardware used to implement the print controller 140. Alternatively, or additionally, the separate components may represent logical blocks implemented by executing software instructions in a processor of the printer controller 140.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 for each primary color are each a 2-dimensional array of pels representing an image of the print job (i.e., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines. In one embodiment, transfer functions may be implemented by print controller 140 and applied directly to image data as a part of the image processing prior to printing. In that case, the contone image data (CTI) is transformed by the transfer functions prior to halftoning.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes based on pel location.

In one embodiment, the halftone design may include a finite set of transition thresholds between a finite collection of successively larger drop sizes, beginning with zero and ending with a maximum drop size. The halftone design may be implemented as threshold arrays (e.g., halftone threshold arrays) such as single bit threshold arrays or multibit threshold arrays. In another embodiment, the halftone design may be implemented as a three-dimensional look-up table with all included gray level values.

In a further embodiment, halftoning module 214 performs the multi-bit halftoning using the halftone design consisting of a set of threshold values for each pel in the sheetside bitmap, where there is one threshold for each non-zero ink drop size. The pel is halftoned with the drop size corresponding to threshold values for that pel. These set of thresholds for a collection of pels is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the pel values in the sheetside bitmap. This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (i.e., a drop size of none where no ink is ejected). Multi-bit halftoning extends the binary threshold array concept to more than one non-zero drop size.

Multi-bit halftoning may use multiple threshold arrays (i.e., multi-bit threshold arrays), one threshold array for each non-zero drop size. The point operation logic is also extended to a set of greater than and less than or equal to operations to determine the drop size by comparing the threshold and image contone data for each pel. Multi-bit defines a power of two set of drop sizes (e.g., two-bit halftone designs have four total drops, including a zero drop size). While power of two may be employed to define the number of drops, systems not following this such as a three total drop system may be used and are still considered multi-bit.

Compensation module 216 performs a compensation process on an un-compensated halftone 218, or previously generated uniformity compensated halftone, received at print controller 140 to generate one or more compensated halftones 220. Compensated halftones 220 are then received at halftoning module 214 along with the sheetside bitmap. In one embodiment, an un-compensated halftone 218 represents a reference halftone design that is modified to create the compensated halftones. In such an embodiment, measurements of the system response are received via measurement module 190 using the un-compensated halftone 218 for printing.

According to one embodiment, compensation module 216 may also be implemented to perform artifact (e.g., jet-out, deviated jet, etc.) compensation for defective pel forming elements 165. As used herein, a jet-out is a print defect (e.g., pel forming element artifact) caused by a completely blocked ink jet nozzle and the result is no ink deposited on the print medium when the blocked ink jet nozzle is instructed to fire. A deviated jet is a print defect (e.g., pel forming element artifact) caused by a partially blocked ink jet nozzle and the result is ink drops deposited on the print medium when the ink jet nozzle is instructed to fire but the ink drops are deposited in positions on the print medium that deviate significantly from the nominal deposition position of an unblocked ink jet nozzle.

In a further embodiment, compensation module 216 generates first and second ink deposition functions corresponding to data generated without pel forming element 165 artifacts and data generated with pel forming element 165 artifacts, respectively. Ink deposition amount is defined to be the volume of ink or colorant per area e.g., milliliters per square centimeter. Alternately mass of ink or colorant per area can also be employed, e.g., milligrams per square centimeter. The first ink deposition function represents a first output ink amount versus input digital count (DC) for each of a plurality of color planes, while the second ink deposition function represents a second output ink amount versus input digital count for each of the plurality of color planes.

Subsequently, compensation module 216 generates transfer functions (e.g., artifact compensation transfer functions) for each of the plurality of color planes based on the first ink deposition function and the second ink deposition function. In a further embodiment, the transfer functions comprise transformed input digital counts, wherein second output ink amounts associated with transformed input digital counts correspond to first output ink amounts associated with untransformed input digital counts for a range of untransformed input digital counts. In such an embodiment, the first and second output ink amounts are substantially equal (e.g., within a predefined threshold) over the range of the untransformed input digital counts. The transformation of input digital counts defined by the transfer functions is applied to image data for columns of data corresponding to columns neighboring (e.g., adjacent) either side of the artifact. Where columns are in the direction parallel to the web movement direction i.e., process direction. The modification of image data may be applied to one, two or more columns of image data on each side of the artifact. Hence the full compensation is comprised of two, four or more columns of image data. While a symmetrical modification of columns of image data is preferred, it is not required. Therefore, modifications to image data might only be applied to one, three, etc. columns of image data adjacent to the artifact.

In an alternative embodiment, compensation module 216 may generate compensated halftones 220. In such an embodiment, compensation module 216 generates compensated halftones 220 for each of the plurality of color planes based on an Inverse Transfer Function (e.g., artifact compensation inverse transfer function) for each of the plurality of color planes derived from the first ink deposition function and the second ink deposition function. In this case the Inverse Transfer Function derived is used to transform (e.g., modify) the thresholds of a halftone threshold array, in the positional vicinity of the jet-out or deviated jet, referred to as a pel forming artifact (e.g., artifact). In such an embodiment, the halftone thresholds are modified by the artifact compensation inverse transfer functions such that the output ink amounts corresponding to modified halftone thresholds with the pel forming element artifacts and the output ink amounts corresponding to un-modified halftone thresholds without the pel forming element artifacts are substantially equal for a range of the input digital counts. In other words, the artifact inverse transfer functions are generated such that when they are applied to modify the halftone thresholds, the output ink amounts corresponding to modified halftone thresholds with the pel forming element artifacts present and the output ink amounts corresponding to un-modified halftone thresholds without the pel forming element artifacts present are substantially equal for a range of the input digital counts.

The threshold transformation defined by the Inverse Transfer Function is applied to one or more thresholds in the halftone threshold array for one or more columns of data corresponding to pel forming element columns neighboring (e.g., adjacent) either side of the pel forming element artifact, where columns are in the direction parallel to the web movement direction i.e., process direction. The modification of threshold data may be applied to one, two or more columns of threshold data on each side of the artifact for each of the drop sizes. Hence the full threshold modification is comprised of two, four or more columns of threshold data respectively for each of the drop sizes. While a symmetrical modification of columns of threshold data is preferred, it is not required. Therefore, modifications to threshold data might only be applied to one, three, etc. columns of threshold data adjacent to the artifact.

Figure 2B:
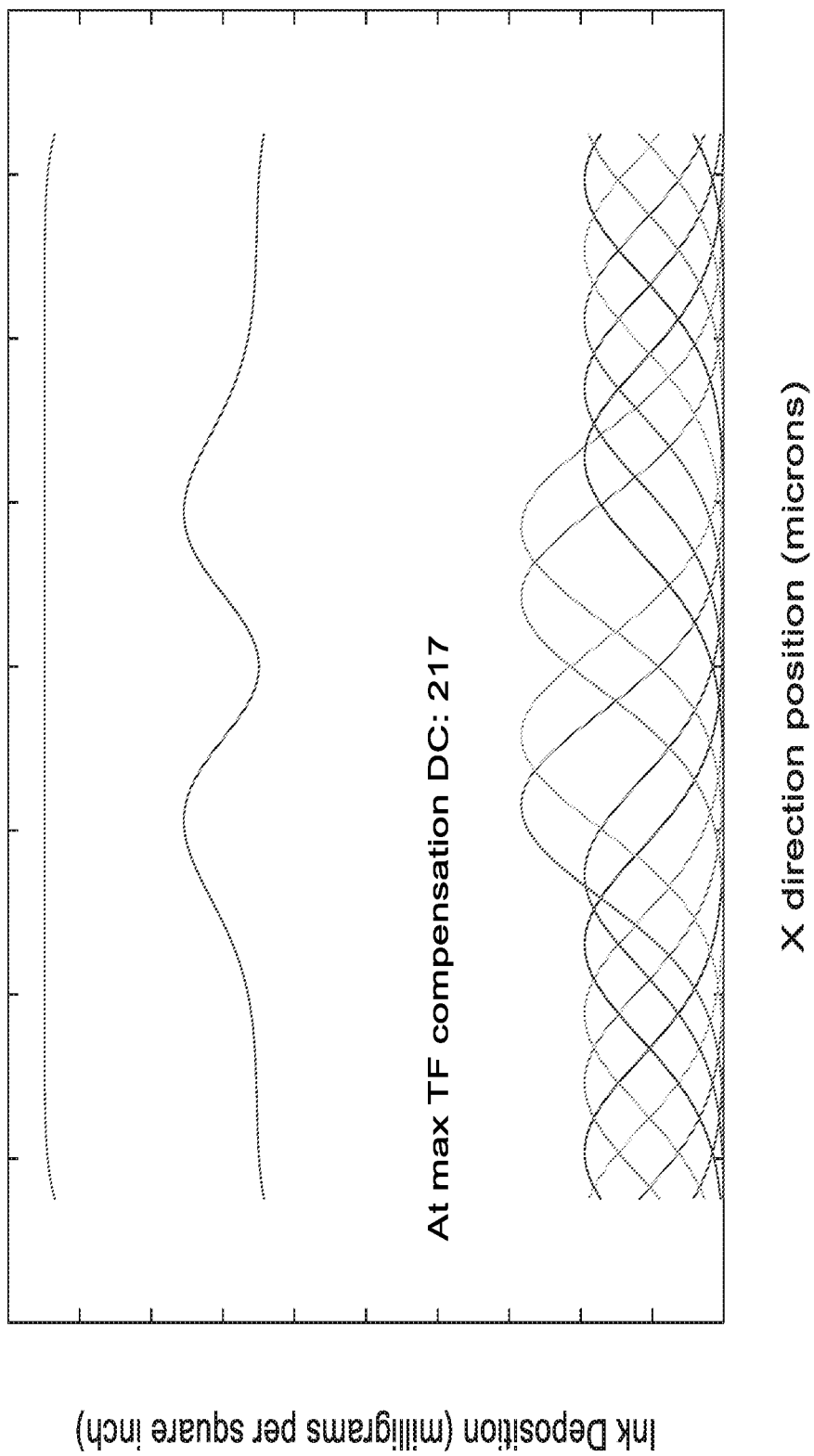
FIG. 2B illustrates one embodiment of a compensation of columns of threshold data relative to the location of jet-out nozzle/deviated jet nozzle.

FIG. 2B illustrates one embodiment of a compensation of columns of threshold data relative to the location of a jet-out/deviated-jet nozzle. In this example a jet-out is located at the middle of the plotted data. Four Gaussians have been boosted, two on each side of jet-out, to compensate for the missing ink deposition created by the jet-out artifact. The level applied to these four compensated nozzles at each Digital Count (DC) is obtained from the Transfer Function (TF) generated from a first and second ink deposition functions. The curve in the middle shows the total ink deposition from all of the Gaussians at DC level 217. The curve illustrates that the boosted four nozzles provided an increased ink deposition so that the level in the "valley" at the jet out location is equal to the ink deposition outside the jet-out region (e.g., near the edges). The curve at the top shows the ink deposition that occurs at level 255 without the jet-out. Without the jet-out compensation the set of Gaussians will all be the same and there will not be a boost.

Figure 3:
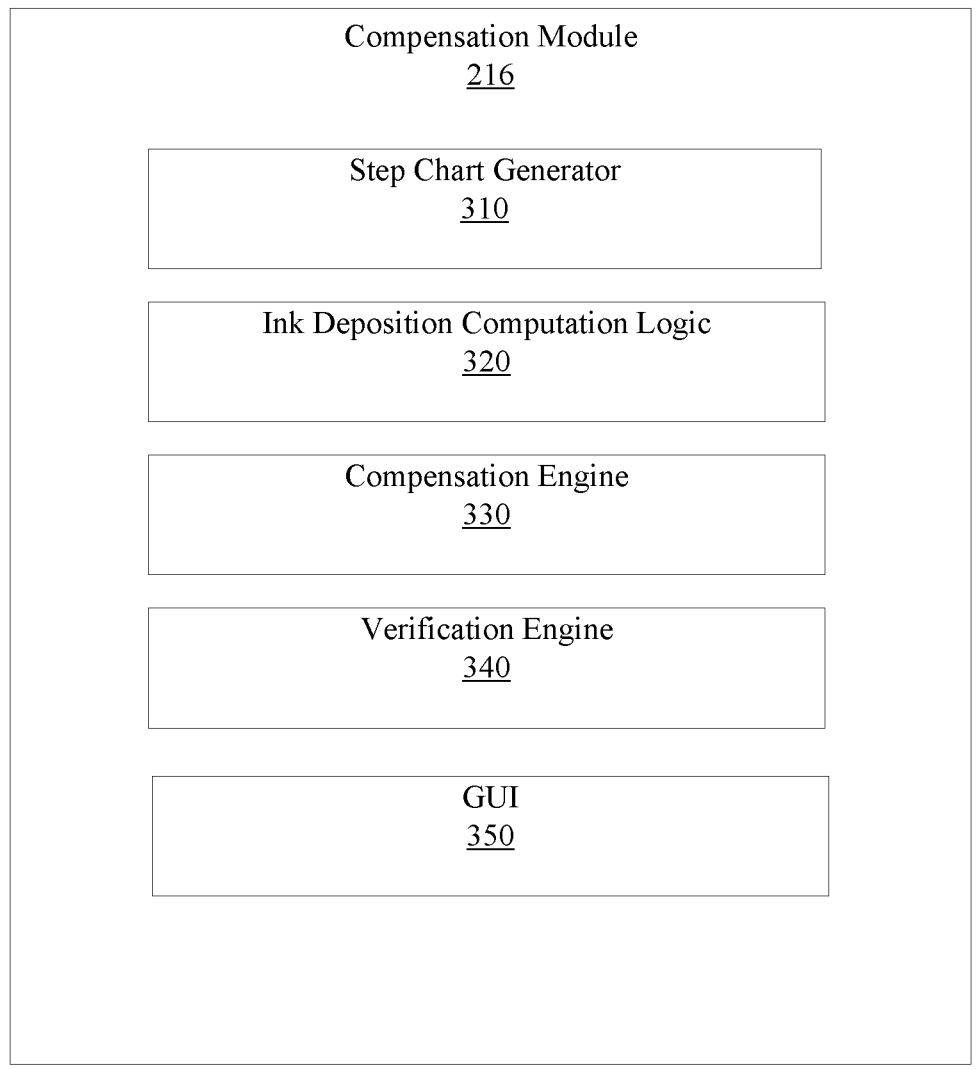
FIG. 3 illustrates one embodiment of a compensation module.

FIG. 3 illustrates one embodiment of compensation module 216. As shown in FIG. 3, compensation module 216 includes a step chart generator 310 implemented to generate step charts. In one embodiment, step chart generator 310 generates a step chart for pel forming elements 165 not having (or without) jet-outs or deviated jets based on an un-compensated halftone 218. In such an embodiment, the step charts use a threshold array associated with the initial un-compensated halftone 218 threshold array without compensation to generate the step chart.

In one embodiment, a step chart is generated by the pel forming elements 165 of printer 160 to generate a CMYK test print image (or step chart image) that includes a number of steps (e.g., bars or stripes) of uniform density in which there may be at least one threshold array for each color of ink used by the printer. The stripe's DC levels may range from paper white (no ink) to maximum DC level for each ink color. The stripes or bars are arranged so that every segment or portion of the print head generates every color and shade of ink. Sufficient pels are included in the height of a bar so that the random variations in the halftone threshold array are removed by averaging. In one embodiment, there is one row in each bar for each row in the halftone threshold array, so that each bar constitutes a complete sample of a halftone design's threshold distribution. The number of columns in each bar represent printing in the regions surrounding the jet-out or deviated jet artifact. That is to say the number of columns includes all of the contributions of ink from nozzles adjacent to the artifact region. For example, using twenty-one columns we have five columns near each edge to reduce the edge effect and five columns on each side of the artifact to account for ink deposition changes caused by the artifact and one column where the artifact is located.

Figure 4:
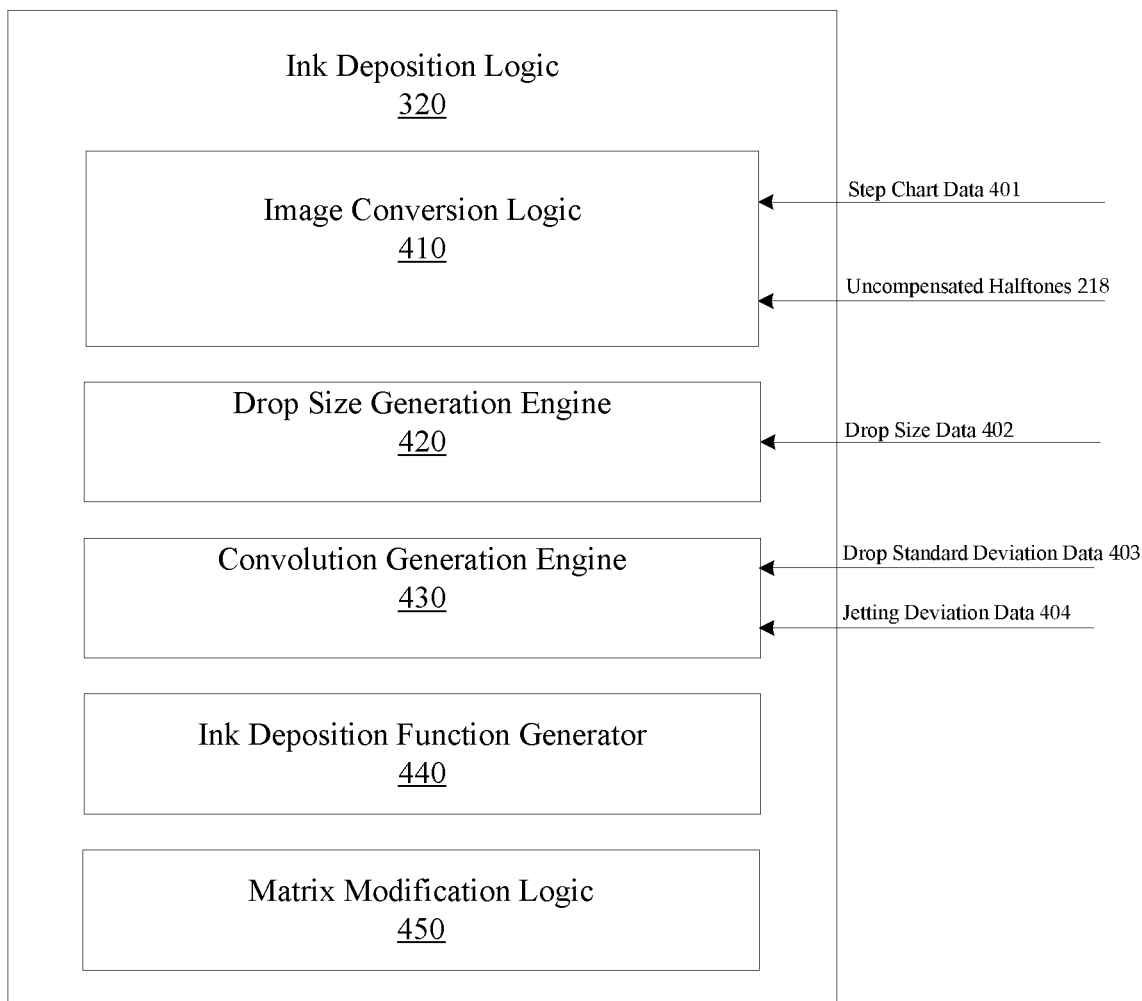
FIG. 4 illustrates one embodiment of ink deposition computation logic.

Compensation module 216 also includes ink deposition computation logic 320. According to one embodiment, ink deposition computation logic 320 receives the step chart images and generates an ink deposition function (e.g., first ink deposition function) based on the contone (DC) level data without pel forming element artifacts. FIG. 4 illustrates one embodiment of ink deposition computation logic 320.

As shown in FIG. 4, ink deposition computation logic 320 includes image conversion logic 410, drop size generation engine 420, convolution generation engine 430 and ink deposition function generator 440. Image conversion logic 410 receives step chart data 401 (e.g., step chart image, step chart contone image, etc.), obtained from step chart generator 310, and converts a CMYK step chart image into separate C, M, Y and K images. In a further embodiment, image conversion logic 410 also uses received un-compensated halftones 218 to convert step chart images to respective ink deposition levels for each color. While each pel in the step chart is associated with a single drop size, the ink deposition levels obtained from the ink deposition logic 320 may be determined at higher resolutions than the step chart to improve the accuracy. Therefore, the ink deposition may be determined at resolutions that are three, five, etc. times greater than the resolution of the step charts to provide sub-pel levels. This facilitates computing the first and second ink deposition functions at a point between two nozzles located at the center of the jet-out artifact. In such an embodiment, the un-compensated halftones 218 are received as a multibit threshold array.

Drop size generation engine 420 receives the C, M, Y and K step chart data 401, as well as drop size data 402 to generate a drop size matrix (e.g., Drop_modulation_matrix (x,y)) associated with each color plane. In one embodiment, a drop size matrix includes a matrix of drop sizes for every pel in the step chart image. Thus, drop size generation engine 420 converts contone levels in the CMYK step chart data to symbolic drop size values (e.g., none, small, medium and large drop sizes) associated with each pel. The conversion of contone levels to symbolic drop sizes may be achieved using the halftoning defined by the respective threshold arrays for each color. Finally, the symbolic values for every drop at each pel are converted into actual drop sizes, which are mass or volumes quantities for each drop, using drop size data 402. The result is a drop size matrix having actual drop sizes for every pel in the step chart. The drop size matrix defines the convolution modulation matrix used in the convolution explained below.

Convolution kernel generation engine 430 creates a convolution kernel for each color plane (C, M, Y and K) for a single drop based on a Gaussian drop standard deviation data 403 (e.g., received via a graphical user interface (GUI) 350). The convolution kernel represents the spatial distribution matrix for a single printed drop of ink. A Gaussian distribution is used to describe how the ink deposition for a printed drop gradually changes away from the center and provides a closed form expression for ink deposition at any point in the spatial distribution of a single printed ink drop. In one embodiment, a single drop mass (TM) is assumed, and an elliptical Gaussian distribution of ink is used, such that:

$$ID(x,y) = \text{Peak\_ink\_deposition} * \exp^{-((x^2)/(2*a^2)+y^2)/(2*b^2))}$$

ID(x, y) may be converted into a separable form as a product of an x direction and y direction functions, such that:

$$ID(x,y) = \text{Peak\_ink\_deposition} * (\exp^{-((x^2)/(2*a^2))}) * (\exp^{-((+y^2)/(2*b^2))}),$$

where Peak_ink_deposition=maximum ink mass per area=TM/(2*pi*a*b)); x and y are distances in X and Y directions; a and b are standard deviations of Gaussian distribution along the X and Y directions.

Alternately volumes for a single drop, instead of mass, may be used for TM to obtain ink deposition in terms of volume per area.

According to one embodiment, the "x" dimension represents horizontal position for different columns in the crossweb direction (e.g., along pel forming elements 165) of a step chart, while "y" represents a vertical position measurement in the process/web movement direction of the step chart. To formulate the equations for the convolution kernel, the previous equations are modified. $\text{GaussKernel}(x, y) = \text{ink\_deposition\_Factor} * (\exp^{-(((x-deltax)^2)/(2*a^2))} * \exp^{-(((y-deltay)^2)/(2*b^2))})$, where $\text{ink\_deposition\_Factor} = 1/(2*pi*a*b)$; This equation defines GaussKernel, which is the convolution kernel used in the convolution explained below. The deltax and deltay define displacements of the center of the convolution kernel, from a nominal location, in the case of deviated jets. Nominally, without jetting deviations deltax=0 and deltay=0.

Ink deposition function generator 440 generates a first ink deposition function (ID1(x,y)) for each color plane (e.g., ID1_C(x, y), ID1_M(x,y), ID1_Y(x, y) and ID1_K(x, y)) by convolving the convolution modulation matrices with the convolution kernels (e.g., GaussKernel) such that:

$$g(x,y) = w * f(x,y),$$

where g(x, y) is the ink deposition function, w is the convolution kernel and f(x, y) is the convolution modulation matrix and * denotes the convolution operation.

In one embodiment, the ink deposition function for each color plane is generated by convolving the ink drop spatial distribution matrices (e.g., convolution modulation matrices) with the corresponding ink drop distribution matrices (e.g., convolution kernels). Accordingly, the convolution adds the contributions of all the drops, considering the different drop sizes for each pel in the convolution modulation matrix, to generate a total ink deposition matrix for the entire step chart.

In one embodiment, the convolution kernel and convolution modulation matrix have a higher resolution than the step chart to obtain higher resolution for the ink deposition functions (e.g., sub-pel) so as to achieve ink deposition functions for points between discrete columns, which corresponds to points between nozzles. The resolution of the convolution kernel and the convolution modulation matrix are the same. The convolution modulation matrix is generated based on the drop size matrix and both represent ink drop distribution of an image (e.g., the step chart image). Generally, each element of the drop size matrix defines a single element of higher resolution convolution modulation matrix, to create an impulse deposition (e.g., ink deposition response for a single drop in a printing system).

Figure 5:
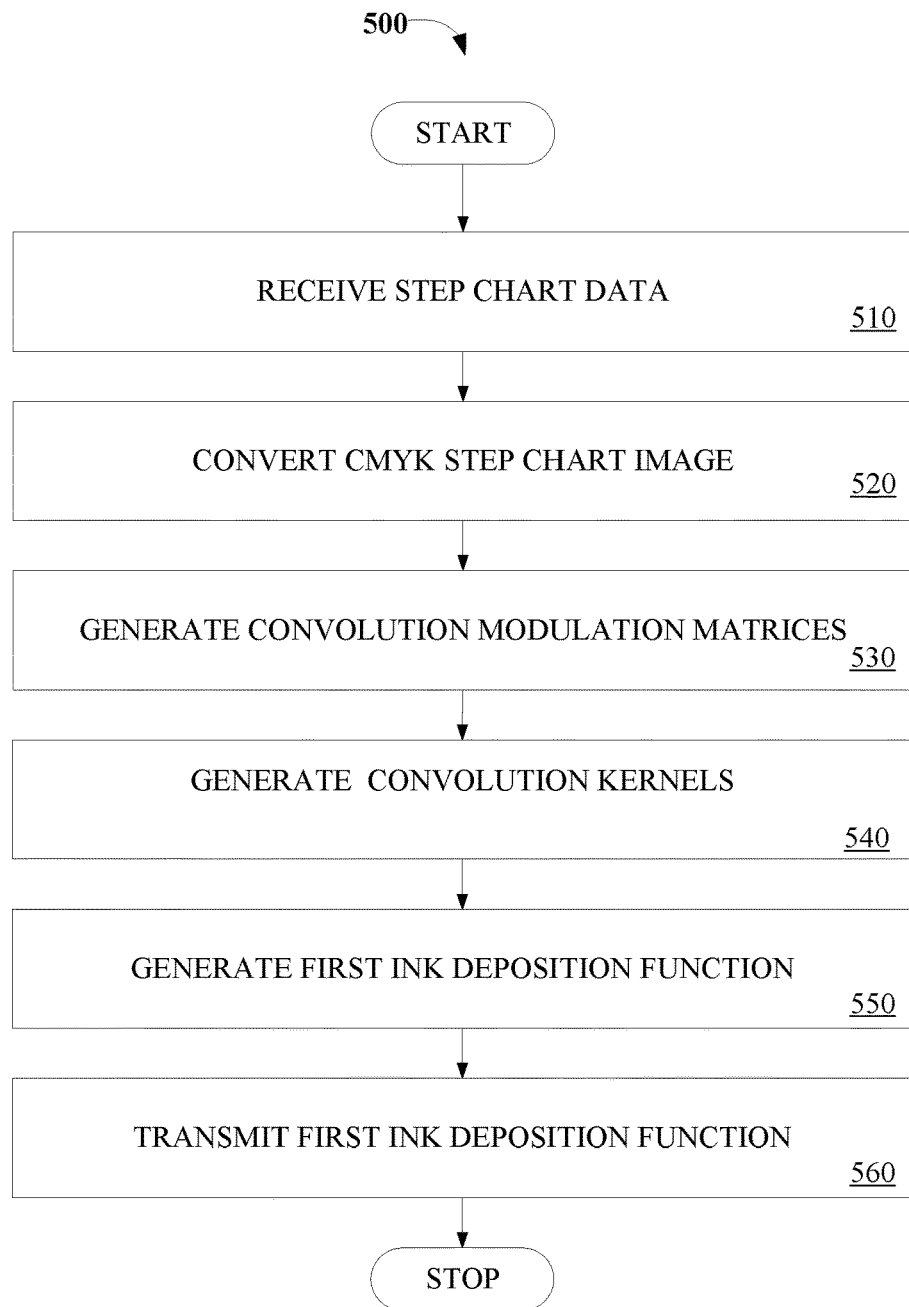
FIG. 5 is a flow diagram illustrating one embodiment of a process to compute ink deposition.

FIG. 5 is a flow diagram illustrating one embodiment of a process 500 to compute the first ink deposition function based on step chart data 401, without pel forming element artifacts. Process 500 may be performed by processing logic that may include hardware (e.g., circuitry, dedicated logic, programmable logic, microcode, etc.), software such as instructions run on a processing device, or a combination thereof. In one embodiment, process 500 is performed by compensation module 216.

At processing block 510, step chart data 401 is received. At processing block 520, the CMYK step chart image generated based on step chart data 401 is converted into separate C, M, Y and K images. At processing block 530, convolution modulation matrices are generated based on the CMYK images and drop size data 402. At processing block 540, convolution kernels are generated. At processing block 550, the ink deposition function (e.g., (ID1(x, y)) for each color plane) is generated by convolving the convolution modulation matrices and convolution kernels. At processing block 560, the first ink deposition function is transmitted.

In a further embodiment, ink deposition computation logic 320 generates a second ink deposition function (ID2(x, y)) for each color plane (e.g., ID2_C(x, y), ID2_M(x, y), ID2_Y(x, y) and ID2_K(x, y)) based on a modified version of the convolution modulation matrices. In such an embodiment, the first and second deposition functions correspond to a common (or same) halftone threshold array. The second ink deposition function represents a modification of the generated convolution modulation matrices to include pel forming element 165 artifacts. Accordingly, matrix modification logic 450 is included to modify the convolution modulation matrix associated with each color plane.

In one embodiment, matrix modification logic 450 modifies the convolution modulation matrices to include jet-outs in one or more pel forming element 165. In one embodiment, the convolution modulation matrices are modified to simulate jet outs. In the case of jet-out compensation, the convolution modulation matrix is modified to define the entire column of drop sizes at the location of the jet-out artifact to values of zero. Therefore, the entire column of pels in this case will not be jetting and the ink deposition contributions that are produced by this missing column/nozzle will be eliminated.

Subsequently, ink deposition function generator 440 generates the second ink deposition function by convolving the modified convolution modulation matrices and the convolution kernels. In the case of deviated jets that are known or determined to be persistent and stable, the convolution kernels are modified to determine displaced convolution kernels. If the deviated jet artifact is not persistent and/or stable in its characteristics, the nozzle associated with the deviated jet can be disabled and the compensation for a jet out type artifact may instead be applied for the deviated jet artifact. When persistent, stable deviated jet compensation is determined, a set of convolution kernels is computed, one convolution kernel for each column in the step chart image. Each displaced convolution kernel is computed based on jetting deviation data 404, to account for the displacements of the jetted ink that occur caused by the deviated jets.

Jetting deviation data 404 represents the amount of positional deviation (e.g., displacement) from nominal position of the jetted ink on the print medium (e.g., jetting deviation) corresponding to each inkjet nozzle. The deltax and deltay in the previous equation define the jetting deviations in the x and y directions respectively that are employed to determine the displaced convolution kernels, in the case of persistent, stable deviated jets.

One example of a persistent and stable deviated jet artifact is the case of adjacent printheads of the same color plane (e.g., printheads in a printhead array) that are imperfectly aligned to each other in the X direction (e.g., scan direction). In that case, nozzles from one of the adjacent printheads will have deviated jet artifacts with reference to corresponding nozzles of another of the adjacent printheads. Ideally in the case of two adjacent printheads that have no nozzle redundancy, their physical alignment results in the distance between the last nozzle of the first printhead and the first nozzle of the second printhead is the same as the nominal nozzle to nozzle spacing (e.g., 1/DPI where DPI is the dots per inch of the printhead nozzles) of each of the two printheads.

The same displaced convolution kernel is used for all pels in a single column when ink deposition function generator 440 determine the ink deposition. To derive the ink deposition functions, a set of nominally located convolution kernels are used (deltax=0 and deltay=0) to compute ink deposition function 1 and a set of displaced convolution kernels are used to compute ink deposition function 2. These ink deposition functions are used to determine a transfer function or inverse transfer function to compensate for the jetting deviations. A single point may be selected to determine the transfer function. Alternately a set of ink depositions, computed at different locations, can be determined for ink deposition 1 and 2 and the depositions combined to determine the compensation transfer function or compensation inverse transfer function. The same multiple deposition approach may also be used when computing the compensation for jet-outs. When jet-outs are determined the set of jetting locations are defined as the nominal spacing of the jetting nozzles.

The convolution kernel size is defined to include all significant contributions from the Gaussian profile drops. The matrix therefore should have values that include for example values that are four standard deviations from the center of the Gaussian drop profile. Where a and b are the values corresponding to one standard deviation. Since deviated jets displace the location of the center of the drop profile by the amount of the deviation, the deviations must be included when determining the size of the convolution kernel to prevent truncation. Displaced convolution kernels associated with deviated jets can have displacements in the x and y directions.

Figure 6:
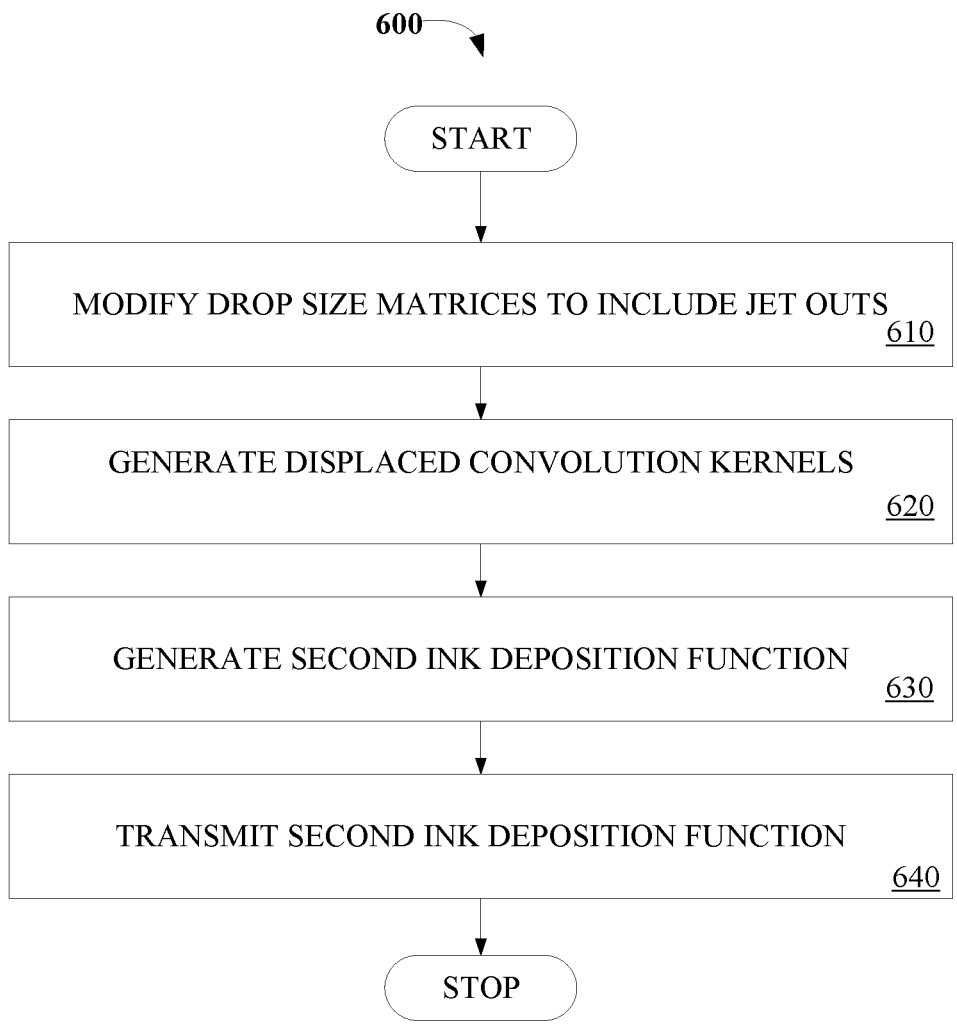
FIG. 6 is a flow diagram illustrating another embodiment of a process to compute ink deposition.

FIG. 6 is a flow diagram illustrating one embodiment of a process 600 to compute the second ink deposition function. Process 600 may be performed by processing logic that may include hardware (e.g., circuitry, dedicated logic, programmable logic, microcode, etc.), software such as instructions run on a processing device, or a combination thereof. In one embodiment, process 600 is performed by compensation module 216.

At processing block 610, the convolution modulation matrices are modified to include pel element 165 jet-outs. If deviated jet ink depositions are being determined, no modifications to the convolution modulation matrices are done. At processing block 620, the displaced convolution kernels are generated to include pel element 165 deviated jets. If jet out ink depositions are being determined, no displaced convolution kernels are determined. At processing block 630, the second ink deposition function (e.g., jet out ink deposition function) is generated by convolving the modified convolution modulation matrices and convolution kernels. Alternatively at processing block 630, the second ink deposition function (e.g., deviated jet ink deposition function) is generated by convolving the convolution modulation matrices and displaced convolution kernels. At processing block 640, the second ink deposition function is transmitted. The first and second ink depositions are determined using the same x direction location (e.g., at the middle of a jet-out artifact).

Figure 7:
FIG. 7 illustrates one embodiment of a compensation engine.

Referring back to FIG. 3, compensation module 216 also includes a compensation engine 330 implemented to perform compensation based on the first ink deposition function and the second ink deposition function. FIG. 7 illustrates one embodiment of compensation engine 330. As shown in FIG. 7, compensation engine 330 includes transfer function generation engine 710 that is used to perform compensation by generating a transfer function (TF_X) for each color plane (e.g., TF_C, TF_M, TF_Y, TF_K) based on the first ink deposition function and the second ink deposition function.

In one embodiment, a transfer function comprises a mapping of an input digital count to an output digital count for a system, where digital count is the gray level or color value representing the pels in a bitmap. In a further embodiment, the transfer functions are generated using received input ink deposition X-direction location data 701. Ink deposition X-direction location data 701 indicates the one or more X-direction locations corresponding to the generated ink deposition functions and are associated with the corresponding generated transfer functions (or inverse transverse functions). Additionally, relationship data 702 (e.g., digital count data) is received indicating an input relationship between the positions (y) and associated digital counts for contone image data. In such an embodiment, transfer function generation engine 710 converts each Y direction pel position in the ink deposition matrix to a digital count (e.g., DC) value corresponding to contone level in the step chart. This provides a relationship so that ID(x, y) is converted into ID(x, DC) prior to generating the transfer functions. As a result, transfer functions are derived from the first and second ink deposition functions ID1 and ID2 based on digital counts DC, such that:

$$ID2\_X^{-1}(ID1\_X(g\_input))=TF\_X(g\_input)=g\_output,$$

where g represents a gray level (or digital count).

Since ID(x, y) values are local and have the influence of halftoning, the conversion to ID1(DC) and ID2(DC) values includes smoothing. The result is a single ink deposition for each DC level that are representative of the average ink deposition at each step in the contone image chart.

Figure 8:
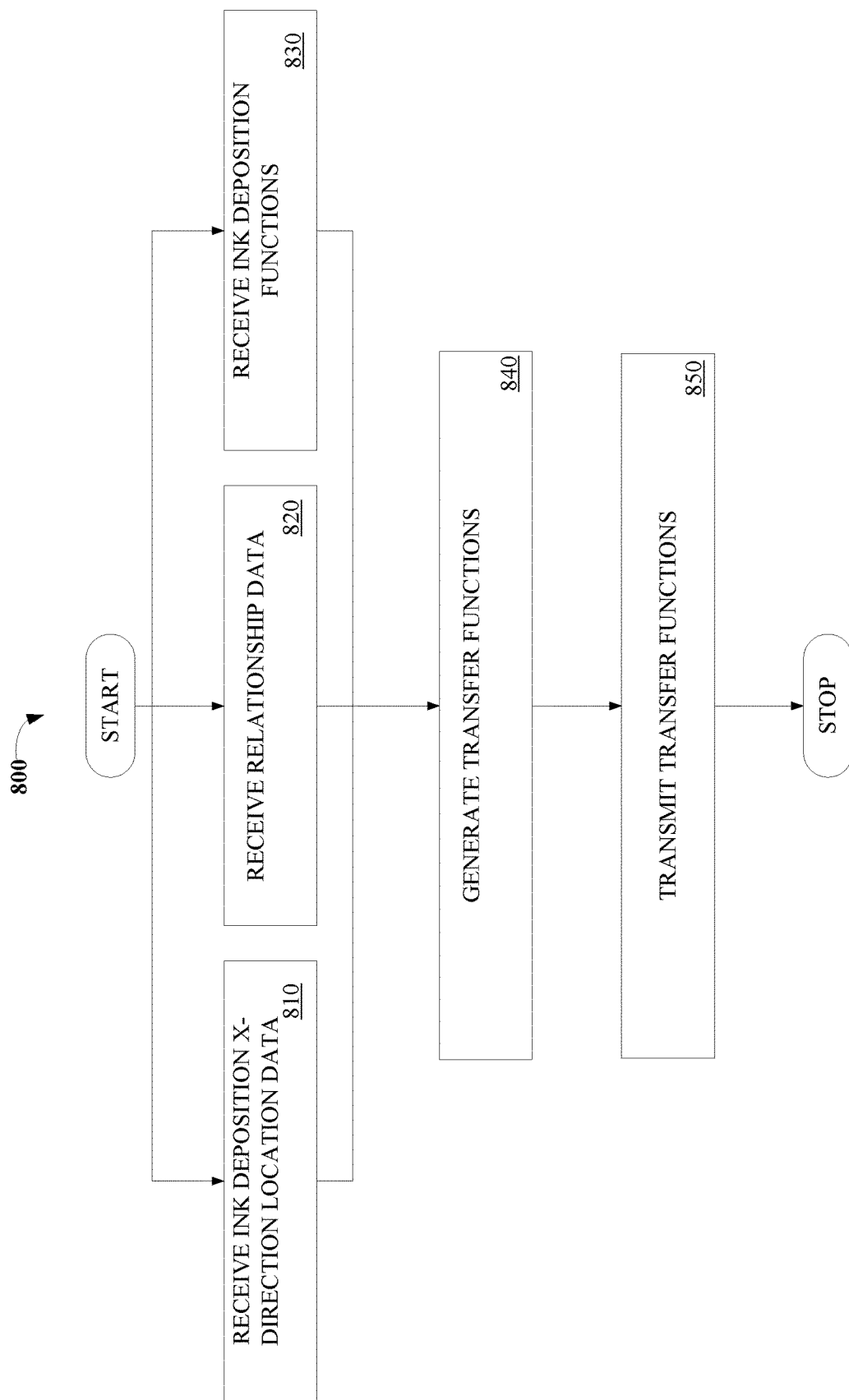
FIG. 8 is a flow diagram illustrating one embodiment of a process for generating transfer functions.

FIG. 8 is a flow diagram illustrating one embodiment of a process 800 for generating compensated transfer functions. Process 800 may be performed by processing logic that may include hardware (e.g., circuitry, dedicated logic, programmable logic, microcode, etc.), software such as instructions run on a processing device, or a combination thereof. In one embodiment, process 800 is performed by compensation module 216.

At processing block 810, ink deposition X-direction location data 701 are received. At processing block 820, relationship data 702 is received. As discussed above, the input relationship data 702 is implemented to convert each pel position measurement indicated in the ink deposition functions to a digital count. At processing block 830, the first and second ink deposition functions are received. At processing block 840, the transfer functions and associated column location data are generated based on the first and second ink deposition functions. At processing block 850, the transfer functions are transmitted. Printer system 130 may receive the transfer functions and apply them either directly to the image data or cascade them with other transfer functions (e.g., uniformity transfer functions) before being applied to the image data. Column location data (e.g., column compensation data) may be transmitted with the transfer functions or separately.

Column location data indicates the column locations where the transfer functions are to be applied to the image data. The transfer functions in the column locations where the jet outs exist may be set to zero as part of this process and doing so ensures that nozzles associated with the jet out do not eject ink and do not unexpectedly change their ink ejection behavior while they are being compensated, which would result in undesirable response non-uniformity. In another embodiment, the nozzles associated with the column location are determined and are disabled from firing as a part of the artifact compensation.

In an alternative embodiment, compensation engine 330 performs compensation by using halftone generation logic 720 (FIG. 7) to generate compensated halftones based on the first and second ink deposition functions. In such an embodiment, compensated halftones are generated for each color plane (e.g., HT_C, HT_M, HT_Y, HT_K) by modifying the thresholds in specific columns adjacent to the artifact, based on the column location data. Each modified column of the threshold array for all drop sizes is transformed using inverse transfer functions (ITF_X) generated for each color plane (e.g., ITF_C, ITF_M, ITF_Y, ITF_K). The same inverse transfer function is used to modify multiple columns as defined by column location data. Columns may correspond to nozzle locations where the artifacts are located.

Inverse transfer function generation engine 715 generates inverse transfer functions that are used to generate compensated halftones. Nozzles adjacent or close to defective nozzles are adjusted to compensate defective nozzles in this way, and compensated halftones may also be used to ensure that defective nozzles always eject no ink, thereby ensuring that the defective nozzle's output is predictable and can be reliably compensated. In another embodiment, the nozzles associated with the column location are determined and are disabled from firing as a part of the artifact compensation.

According to one embodiment, the inverse transfer functions are applied to specific columns of the threshold arrays of un-compensated halftones to generate the compensated halftones. An inverse transfer function is the reversed (e.g., inverted) application of the transfer function, where the output digital count values of the transfer function form the input digital count values of the inverse transfer function and the input digital count values of the transfer function form the output digital count values of the inverse transfer function. The inverse transfer functions may be generated based on a mathematical conversion of the transfer functions. ITF may also be derived directly from the ID1 and ID2 functions as follows:

$$\text{ID1}\_X^{-1}(\text{ID2}\_X(g\_\text{input})) = \text{ITF}\_X(g\_\text{input}) = g\_\text{output},$$

where g represents digital count threshold values. g_input is the initial threshold values from the un-compensated halftone and g_output is the compensated threshold array values for the compensation halftone.

Figure 9:
FIG. 9 is a flow diagram illustrating one embodiment of a process for generating compensated halftones.

FIG. 9 is a flow diagram illustrating one embodiment of a process 900 for generating compensated halftones. Process 900 may be performed by processing logic that may include hardware (e.g., circuitry, dedicated logic, programmable logic, microcode, etc.), software such as instructions run on a processing device, or a combination thereof. In one embodiment, process 900 is performed by compensation module 216.

At processing block 910, ink deposition X-direction location data 701 are received. At processing block 920, relationship data 702 is received. At processing block 930, the first and second ink deposition functions are received. At processing block 940, the inverse transfer functions and associated column location data are generated (e.g., based on the transfer functions or based on the first and second ink deposition functions).

At processing block 950, the compensated halftones are generated. As discussed above, the compensated halftones are generated by applying the inverse transfer functions to specific columns as defined by column location data of the un-compensated halftone 218 implemented to generate the compensated halftone threshold array. At processing block 960, the compensated halftones (e.g., compensated halftone threshold arrays) are transmitted. Printer system 130 may receive the compensated halftones and apply them during the printing process. Column location data (e.g., column compensation data) may be transmitted with the compensated halftones or separately. Column location data indicates the column locations where the compensated halftones are to be applied to the image data.

A correspondence between the column location data and the nozzles must be established. Measurement module 190 may be employed to obtain image data for this purpose. The location of a defective nozzle is determined by scanning a test pattern that is printed in the margins between the sheets of printed matter or on sheets that are later discarded. The test pattern includes fiducial features having known nozzle locations.

Measurements determine that an artifact exists and whether it is a deviated jet or a jet-out. Analysis determines the location of the artifact relative to the known locations of the fiducial marks. Using the scanned image defect locations and interpolating between the fiducial marks enables creation of a mapping to accurately localize the defect to a specific nozzle location. Defects are inserted at specific known column locations in the ink deposition analysis. This forms a relationship between columns, X direction distances in the ink deposition analysis and the nozzle locations.

The column location data for threshold arrays or image data, used when applying compensation to the nozzle region corresponding to the artifact, is obtained from this relationship. For example, assume the scanned image analysis determines that physical nozzle number 203 is not jetting. Assume also that column 11 is where the jet-out occurs in the ink deposition analysis and x=0 in the middle of column 11. Therefore column 11, where the jet-out occurs, corresponds to nozzle number 203 and the computed compensation transfer function at x=0 is used to compensate image or halftone data for nozzles 201, 202, 204 and 205. This assumes four nozzle correction is used. As described previously, the transfer function for nozzle 203 is defined to be all zeros, disabling jetting by this nozzle. This prevents the jet-out nozzle from contributing ink deposition in the event that the nozzle recovers its jetting function.

Referring back to FIG. 3, a verification engine 340 is also included within compensation module 216. Verification engine 340 applies compensation data to each of the color planes to generate compensated ink deposition functions (e.g., ID3_C, ID3_M, ID3_Y, ID3_K). In one embodiment, verification engine 340 applies the generated transfer functions to image data e.g., step chart data for each of the plurality of color planes to generate the compensated ink deposition functions. However, in an alternative embodiment, verification engine 340 employs the compensated halftones to generate the compensated ink deposition functions. This provides a means to verify TF compensated or halftone compensated artifacts.

Figure 10:
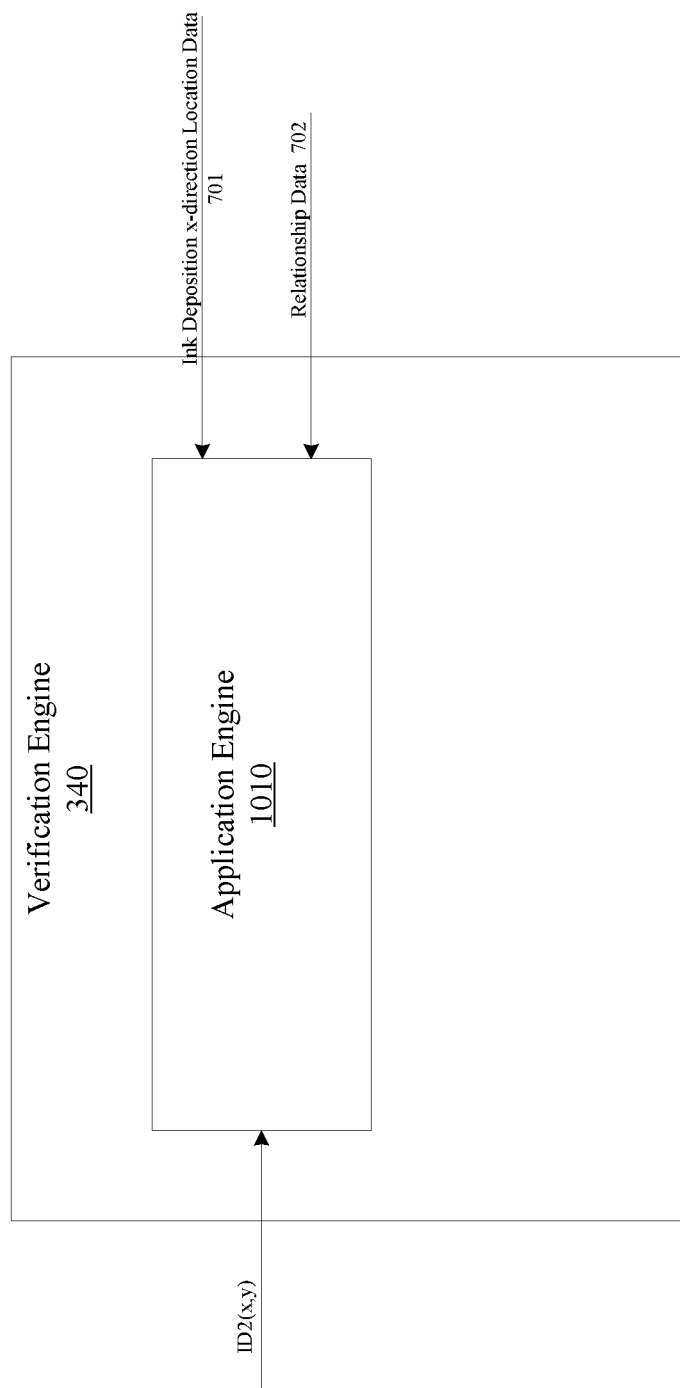
FIG. 10 illustrates one embodiment of a verification engine.

FIG. 10 illustrates one embodiment of verification engine 340, which includes an application engine 1010 to apply the compensation data. As shown in FIG. 10, application engine 1010 receives input ink deposition X-direction location data 701, relationship data 702 and the second ink deposition functions (ID2(x,y)). In the transfer function embodiment, the generated transfer functions are received and applied to step chart image data to generate compensated data. This produces modified chart data that can be processed to determine the efficacy of the compensation. In this case the new chart data entirely replaces the chart data used to derive the initial transfer functions. The replacement chart data has contone levels that are transformed for specific columns by the compensation TFs.

Figure 11:
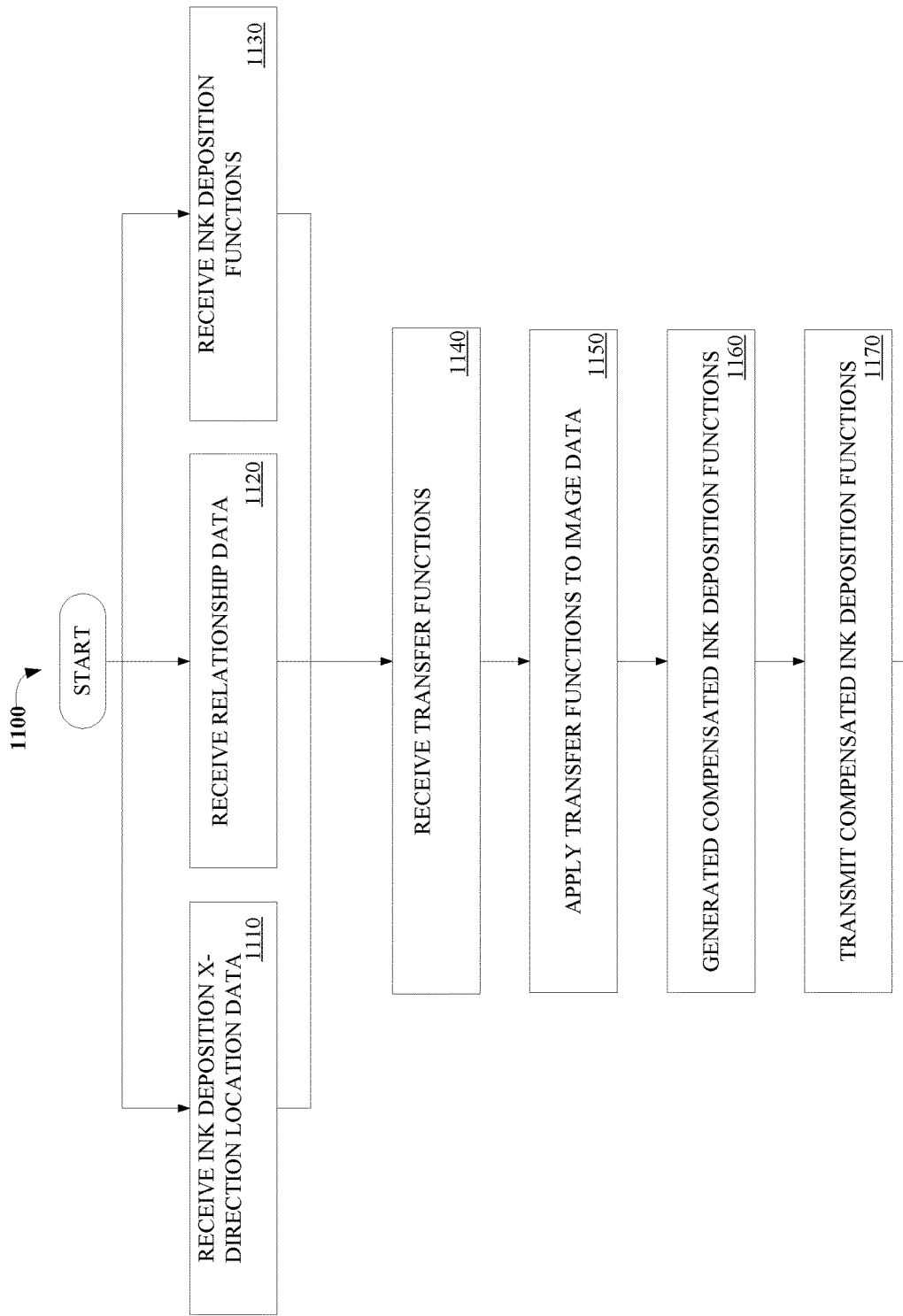
FIG. 11 is a flow diagram illustrating one embodiment of a verification process.

FIG. 11 is a flow diagram illustrating one embodiment of a verification process 1100 using transfer functions. Process 1100 may be performed by processing logic that may include hardware (e.g., circuitry, dedicated logic, programmable logic, microcode, etc.), software such as instructions run on a processing device, or a combination thereof. In one embodiment, process 1100 is performed by compensation module 216.

At processing block 1110, ink deposition X-direction location data 701 is received. At processing block 1120, relationship data 702 is received. At processing block 1130, the second ink deposition functions are received. At processing block 1140, the generated transfer functions are received. At processing block 1150, the transfer functions are applied to step chart image data at the columns defined by 1110. At processing block 1160, compensated ink deposition functions are generated using the transfer functions. At processing block 1170, the compensated ink deposition functions are transmitted. The transmitted compensated ink depositions ID3 can be compared to the ideal ink deposition functions ID1.

In the compensated halftone embodiment, the generated compensated halftones are received and used to render step chart image data to generate ink deposition estimate with compensation applied at the location defined by block 1210. The ink deposition locations defined in block 1210 may be the same as the ones used when the ID1 and ID2 ink depositions are computed to provide an accurate comparison.

Figure 12:
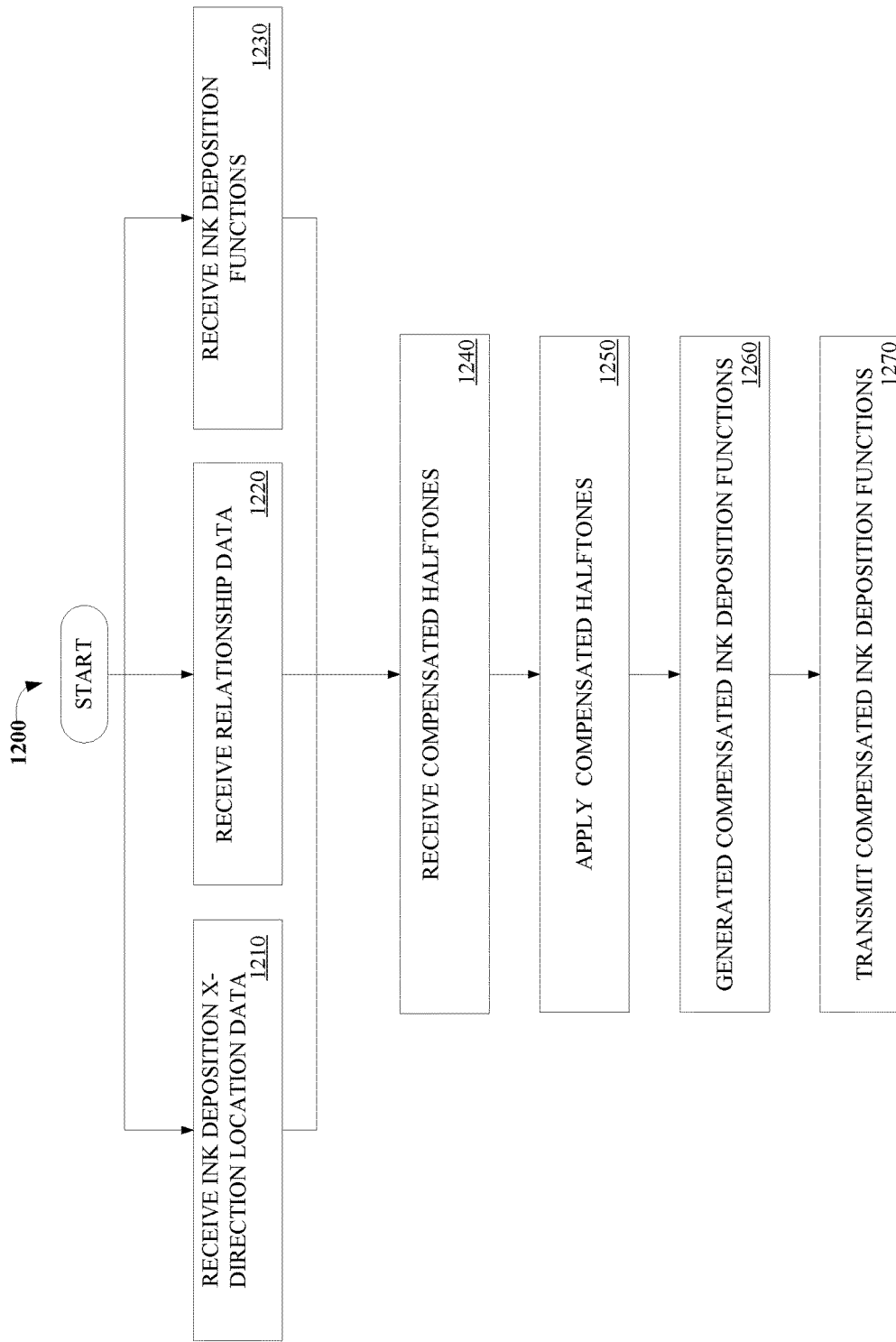
FIG. 12 is a flow diagram illustrating another embodiment of a verification process.

FIG. 12 is a flow diagram illustrating one embodiment of a verification process 1200 using compensated halftones. Process 1200 may be performed by processing logic that may include hardware (e.g., circuitry, dedicated logic, programmable logic, microcode, etc.), software such as instructions run on a processing device, or a combination thereof. In one embodiment, process 1200 is performed by compensation module 216.

At processing block 1210, ink deposition X-direction location data 701 is received. At processing block 1220, relationship data 702 is received. At processing block 1230, the second ink deposition functions are received. At processing block 1240, the generated compensated halftones are received. At processing block 1250, the compensated halftones are applied to image data. At processing block 1260, compensated ink deposition functions are generated using the compensated halftones. At processing block 1270, the compensated ink deposition functions are transmitted. The transmitted compensated ink depositions ID3 can be compared to the ideal ink deposition functions ID1.

Figure 13:
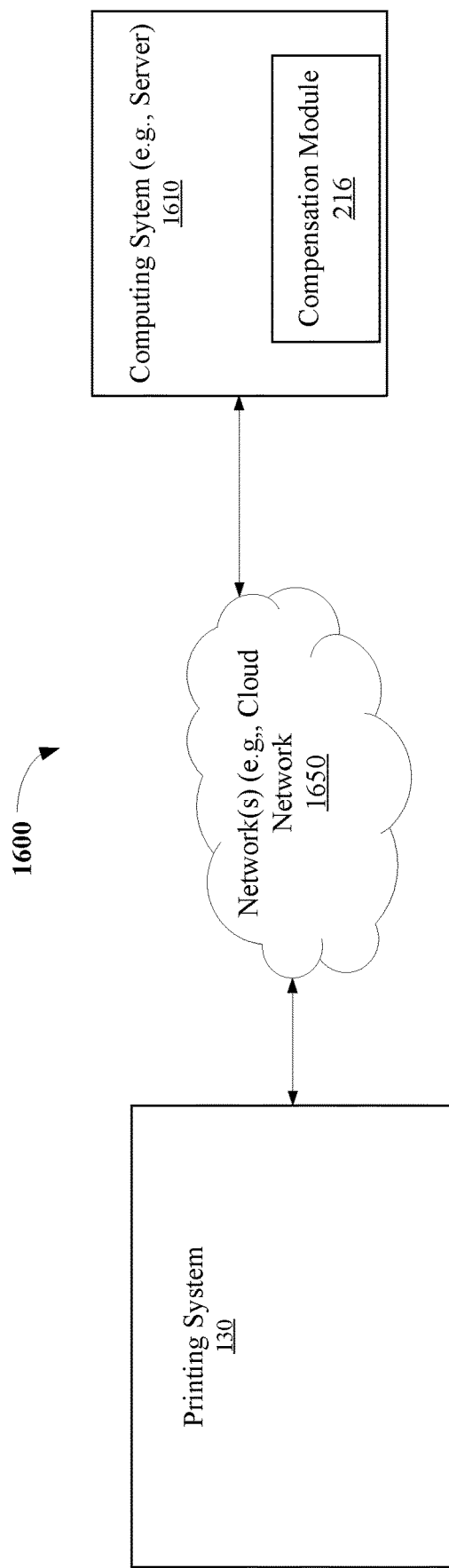
FIG. 13 illustrates one embodiment of a compensation module implemented in a network.

Although shown as a component of print controller 140, other embodiments may feature compensation module 216 included within an independent device, or combination of devices, communicably coupled to print controller 140. For instance, FIG. 13 illustrates one embodiment of a compensation module 216 implemented in a network 1600. As shown in FIG. 13, compensation module 216 is included within a computing system 1610 and transmits compensated halftones 220 and/or transfer functions to printing system 130 via a cloud network 1650. Printing system 130 receives compensated 220 halftones and/or transfer functions.

Figure 14:
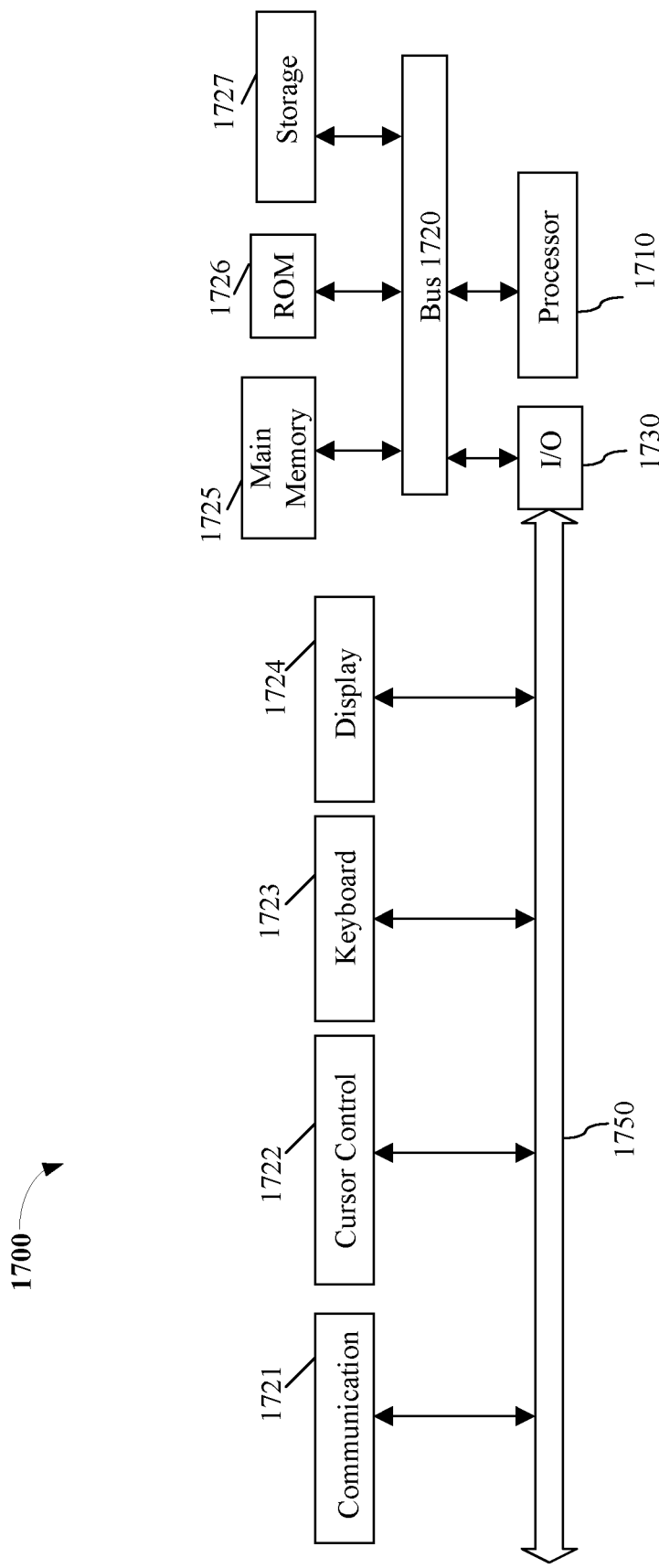
FIG. 14 illustrates one embodiment of a computer system.

FIG. 14 illustrates a computer system 1700 on which printing system 130 and/or compensation module 216 may be implemented. Computer system 1700 includes a system bus 1720 for communicating information, and a processor 1710 coupled to bus 1720 for processing information.

Computer system 1700 further comprises a random-access memory (RAM) or other dynamic storage device 1725 (referred to herein as main memory), coupled to bus 1720 for storing information and instructions to be executed by processor 1710. Main memory 1725 also may be used for storing temporary variables or other intermediate information during execution of instructions by processor 1710.

Computer system 1700 also may include a read only memory (ROM) and or other static storage device 1726 coupled to bus 1720 for storing static information and instructions used by processor 1710.

A data storage device 1727 such as a magnetic disk or optical disc and its corresponding drive may also be coupled to computer system 1700 for storing information and instructions. Computer system 1700 can also be coupled to a second I/O bus 1750 via an I/O interface 1730. A plurality of I/O devices may be coupled to I/O bus 1750, including a display device 1724, an input device (e.g., an alphanumeric input device 1723 and or a cursor control device 1722). The communication device 1721 is for accessing other computers (servers or clients). The communication device 1721 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store compensation logic and one or more processors coupled with the at least one physical memory device to execute the compensation logic to generate first ink deposition function representing a first output ink amount versus input digital count for each of a plurality of color planes, generate second ink deposition function representing a second output ink amount versus input digital count for each of the plurality of color planes and generate transfer functions for each of the plurality of color planes based on the first ink deposition function and the second ink deposition function, wherein the transfer functions transform input digital counts.

Example 2 includes the subject matter of Example 1, wherein the input digital counts are transformed by the artifact compensation transfer functions such that the second output ink amounts corresponding to transformed input digital counts and the first output ink amounts corresponding to untransformed input digital counts are substantially equal for a range of the untransformed input digital counts.

Example 3 includes the subject matter of Examples 1 and 2, wherein the first ink deposition function is generated based on ink drop distribution matrices generated without pel forming element artifacts.

Example 4 includes the subject matter of Examples 1-3, wherein generating the first ink deposition function comprises receiving step chart data, generating first ink drop distribution matrices for each of the plurality of color planes based on the step chart data, generating first ink drop spatial distribution matrices for each of the plurality of color planes and convolving the first ink drop distribution matrices with the corresponding first ink drop spatial distribution matrices to generate the first ink deposition function.

Example 5 includes the subject matter of Examples 1-4, wherein generating the second ink deposition function comprises modifying the first ink drop distribution matrices to include pel forming element artifacts to generate second ink drop distribution matrices and convolving the second ink drop distribution matrices with the corresponding first ink drop spatial distribution matrices to generate the second ink deposition function.

Example 6 includes the subject matter of Examples 1-5, wherein generating the artifact compensation transfer functions comprises receiving ink deposition x-direction location data, receiving digital count data and generating the artifact compensation transfer functions based on the ink deposition x-direction location data, digital count data, the first ink deposition function and the second ink deposition function.

Example 7 includes the subject matter of Examples 1-6, wherein the compensation logic applies the artifact compensation transfer functions to image data for each of the plurality of color planes.

Example 8 includes the subject matter of Examples 1-7, wherein an ink deposition function is a function of a pel forming element column.

Example 9 includes the subject matter of Examples 1-8, wherein the first and second deposition functions correspond to a common (or same) halftone design.

Example 10 includes the subject matter of Examples 1-9, further comprising a print engine comprising a plurality of pel forming elements.

Some embodiments pertain to Example 11 that includes a method comprising generating first ink deposition function representing a first output ink amount versus input digital count for each of a plurality of color planes without pel forming element artifacts, generating second ink deposition function representing a second output ink amount versus input digital count for each of the plurality of color planes with pel forming element artifacts; and generating artifact compensation transfer functions for each of the plurality of color planes based on the first ink deposition function and the second ink deposition function, wherein the artifact compensation transfer functions transform input digital counts.

Example 12 includes the subject matter of Example 11, wherein the input digital counts are transformed by the artifact compensation transfer functions such that the second output ink amounts corresponding to transformed input digital counts and the first output ink amounts corresponding to untransformed input digital counts are substantially equal for a range of the untransformed input digital counts.

Example 13 includes the subject matter of Examples 11 and 12, wherein the first ink deposition function is generated based on ink drop distribution matrices generated without pel forming element artifacts.

Example 14 includes the subject matter of Examples 11-13, wherein generating the first ink deposition function comprises receiving step chart data, generating first ink drop distribution matrices for each of the plurality of color planes based on the step chart data, generating first ink drop spatial distribution matrices for each of the plurality of color planes and convolving the first ink drop distribution matrices with the corresponding first ink drop spatial distribution matrices to generate the first ink deposition function.

Example 15 includes the subject matter of Examples 11-14, wherein generating the second ink deposition function comprises modifying the first ink drop distribution matrices to include pel forming element artifacts to generate second ink drop distribution matrices and convolving the second ink drop distribution matrices with the corresponding first ink drop spatial distribution matrices to generate the second ink deposition function.

Some embodiments pertain to Example 16 that includes at least one computer readable medium having instructions stored thereon, which when executed by one or more processors, cause the processors to generate first ink deposition function representing a first output ink amount versus input digital count for each of a plurality of color planes, generate second ink deposition function representing a second output ink amount versus input digital count for each of the plurality of color planes and generate transfer functions for each of the plurality of color planes based on the first ink deposition function and the second ink deposition function, wherein the transfer functions transform input digital counts.

Example 17 includes the subject matter of Example 16, wherein the input digital counts are transformed by the artifact compensation transfer functions such that the second output ink amounts corresponding to transformed input digital counts and the first output ink amounts corresponding to untransformed input digital counts are substantially equal for a range of the untransformed input digital counts.

Example 18 includes the subject matter of Examples 16 and 17, wherein the first ink deposition function is generated based on ink drop distribution matrices generated without pel forming element artifacts.

Example 19 includes the subject matter of Examples 16-18, wherein generating the first ink deposition function comprises receiving step chart data, generating first ink drop distribution matrices for each of the plurality of color planes based on the step chart data, generating first ink drop spatial distribution matrices for each of the plurality of color planes and convolving the first ink drop distribution matrices with the corresponding first ink drop spatial distribution matrices to generate the first ink deposition function.

Example 20 includes the subject matter of Examples 16-19, wherein generating the second ink deposition function comprises modifying the first ink drop distribution matrices to include pel forming element artifacts to generate second ink drop distribution matrices and convolving the second ink drop distribution matrices with the corresponding first ink drop spatial distribution matrices to generate the second ink deposition function.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store compensation logic; and
   one or more processors coupled with the at least one physical memory device to execute the compensation logic to:
   generate first ink deposition function representing a first output ink amount versus input digital count for each of a plurality of color planes without pel forming element artifacts;
   generate second ink deposition function representing a second output ink amount versus the input digital count for each of the plurality of color planes with the pel forming element artifacts; and
   generate artifact compensation transfer functions for each of the plurality of color planes based on the first ink deposition function and the second ink deposition function, wherein the artifact compensation transfer functions transform input digital counts.

2. The system of claim 1, wherein the input digital counts are transformed by the artifact compensation transfer functions such that the second output ink amounts corresponding to transformed input digital counts and the first output ink amounts corresponding to untransformed input digital counts are substantially equal for a range of the untransformed input digital counts.

3. The system of claim 2, wherein the first ink deposition function is generated based on ink drop distribution matrices generated without the pel forming element artifacts.

4. The system of claim 3, wherein generating the first ink deposition function comprises receiving step chart data, generating first ink drop distribution matrices for each of the plurality of color planes based on the step chart data, generating first ink drop spatial distribution matrices for each of the plurality of color planes and convolving the first ink drop distribution matrices with corresponding first ink drop spatial distribution matrices to generate the first ink deposition function.

5. The system of claim 4, wherein generating the second ink deposition function comprises modifying the first ink drop distribution matrices to include the pel forming element artifacts to generate second ink drop distribution matrices and convolving the second ink drop distribution matrices with the corresponding first ink drop spatial distribution matrices to generate the second ink deposition function.

6. The system of claim 5, wherein generating the artifact compensation transfer functions comprises receiving ink deposition x-direction location data, receiving digital count data and generating the artifact compensation transfer functions based on the ink deposition x-direction location data, the digital count data, the first ink deposition function and the second ink deposition function.

7. The system of claim 1, wherein the compensation logic applies the artifact compensation transfer functions to image data for each of the plurality of color planes.

8. The system of claim 1, wherein an ink deposition function is a function of a pel forming element column.

9. The system of claim 1, wherein the first and second deposition functions correspond to a common halftone design.

10. The system of claim 1, further comprising a print engine comprising a plurality of pel forming elements.

11. A method comprising:
    generating first ink deposition function representing a first output ink amount versus input digital count for each of a plurality of color planes without pel forming element artifacts;
    generating second ink deposition function representing a second output ink amount versus the input digital count for each of the plurality of color planes with the pel forming element artifacts; and
    generating artifact compensation transfer functions for each of the plurality of color planes based on the first ink deposition function and the second ink deposition function, wherein the artifact compensation transfer functions transform input digital counts.

12. The method of claim 11, wherein the input digital counts are transformed by the artifact compensation transfer functions such that the second output ink amounts corresponding to transformed input digital counts and the first output ink amounts corresponding to untransformed input digital counts are substantially equal for a range of the untransformed input digital counts.

13. The method of claim 12, wherein the first ink deposition function is generated based on ink drop distribution matrices generated without the pel forming element artifacts.

14. The method of claim 13, wherein generating the first ink deposition function comprises:
    receiving step chart data;
    generating first ink drop distribution matrices for each of the plurality of color planes based on the step chart data;
    generating first ink drop spatial distribution matrices for each of the plurality of color planes; and
    convolving the first ink drop distribution matrices with corresponding first ink drop spatial distribution matrices to generate the first ink deposition function.

15. The method of claim 14, wherein generating the second ink deposition function comprises:
    modifying the first ink drop distribution matrices to include the pel forming element artifacts to generate second ink drop distribution matrices; and
    convolving the second ink drop distribution matrices with the corresponding first ink drop spatial distribution matrices to generate the second ink deposition function.

16. At least one non-transitory computer readable medium having instructions stored thereon, which when executed by one or more processors, cause the processors to:
    generate first ink deposition function representing a first output ink amount versus input digital count for each of a plurality of color planes without pel forming element artifacts;
    generate second ink deposition function representing a second output ink amount versus the input digital count for each of the plurality of color planes with the pel forming element artifacts; and
    generate artifact compensation transfer functions for each of the plurality of color planes based on the first ink deposition function and the second ink deposition function, wherein the artifact compensation transfer functions transform input digital counts.

17. The computer readable medium of claim 16, wherein the input digital counts are transformed by the artifact compensation transfer functions such that the second output ink amounts corresponding to transformed input digital counts and the first output ink amounts corresponding to untransformed input digital counts are substantially equal for a range of the untransformed input digital counts.

18. The computer readable medium of claim of claim 17, wherein the first ink deposition function is generated based on ink drop distribution matrices generated without the pel forming element artifacts.

19. The computer readable medium of claim 18, wherein generating the first ink deposition function comprises:
   receiving step chart data;
   generating first ink drop distribution matrices for each of the plurality of color planes based on the step chart data;
   generating first ink drop spatial distribution matrices for each of the plurality of color planes; and
   convolving the first ink drop distribution matrices with corresponding first ink drop spatial distribution matrices to generate the first ink deposition function.

20. The computer readable medium of claim 19, wherein generating the second ink deposition function comprises:
   modifying the first ink drop distribution matrices to include the pel forming element artifacts to generate second ink drop distribution matrices; and
   convolving the second ink drop distribution matrices with the corresponding first ink drop spatial distribution matrices to generate the second ink deposition function.

\* \* \* \* \*